Jan. 19, 1971     A. G. McMILLAN     3,555,775
APPARATUS FOR INCASING PRODUCT
Filed July 1, 1969     2 Sheets-Sheet 1
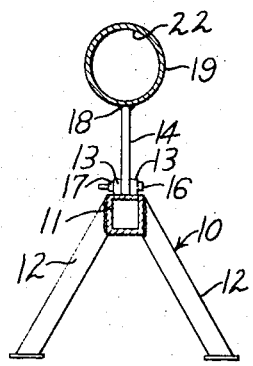
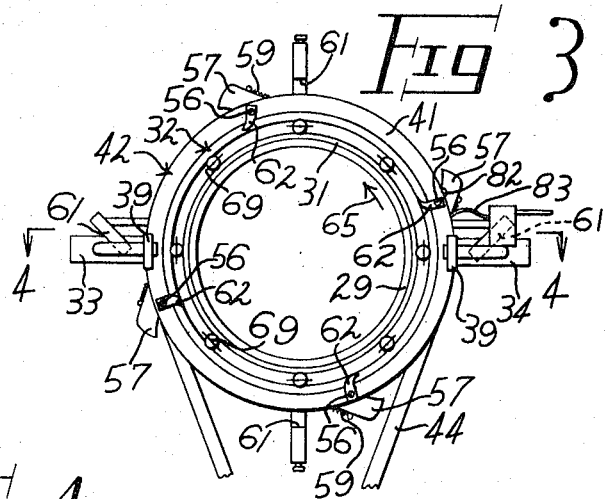
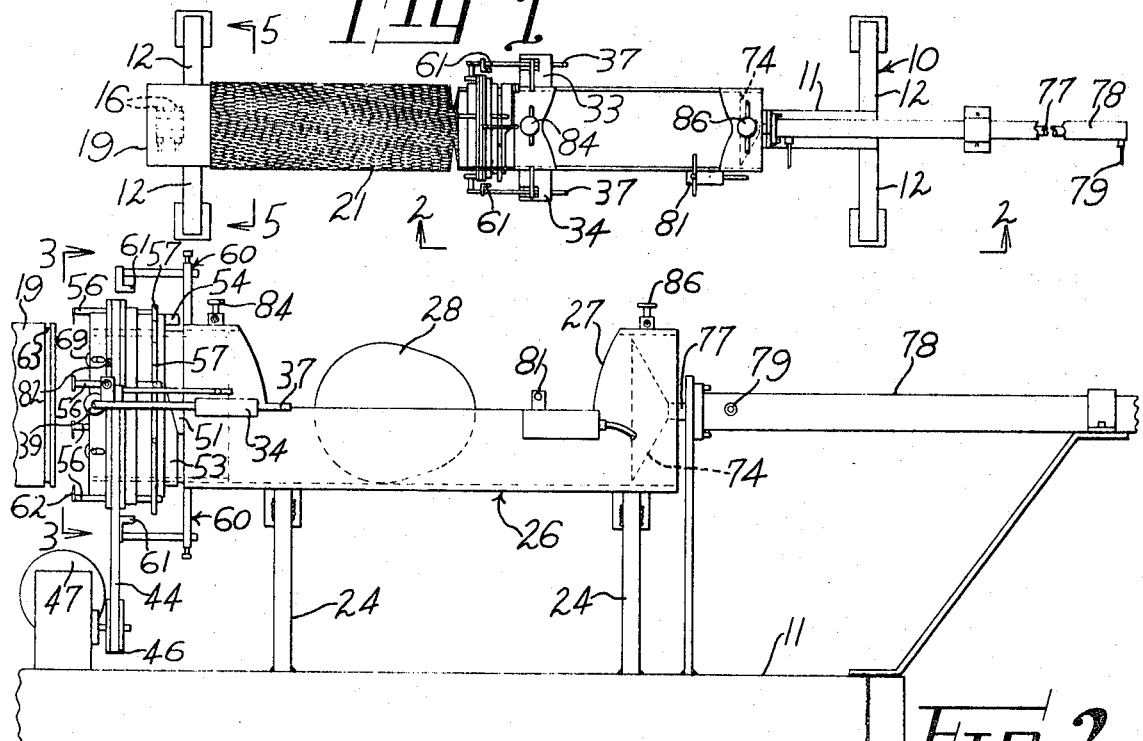
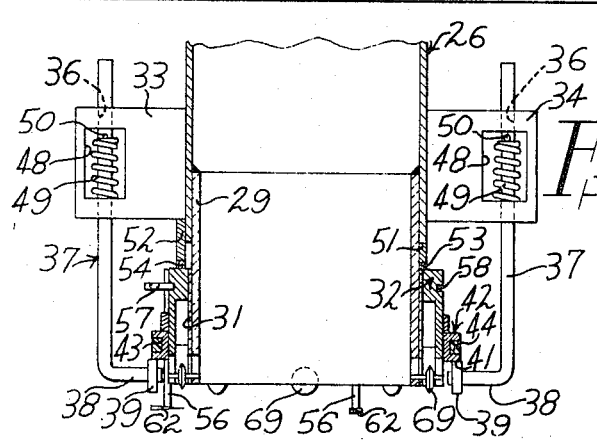
INVENTOR.
Allen G. McMillan
BY
Jennings, Carter & Thompson
Attorneys

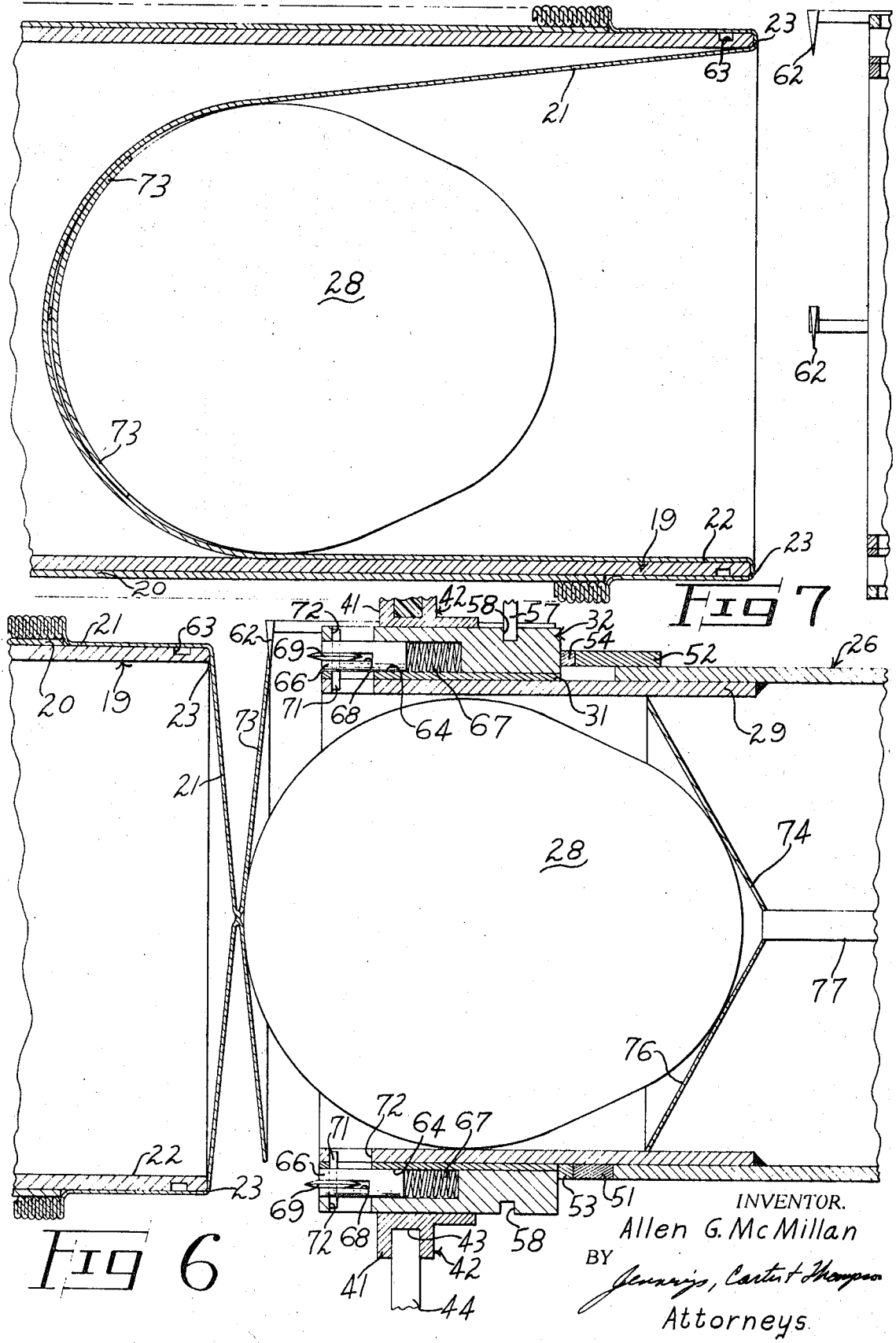

United States Patent Office 3,555,775
Patented Jan. 19, 1971

3,555,775
APPARATUS FOR INCASING PRODUCT
Allen G. McMillan, Rte. 1, Munford, Ala. 36268
Filed July 1, 1969, Ser. No. 838,063
Int. Cl. B65b 9/16
U.S. Cl. 53—181                                   8 Claims

ABSTRACT OF THE DISCLOSURE

Product incasing apparatus having support carrying tubular casing for longitudinal movement along outer surface of support with passageway through support for passing casing. Twist applied to casing in spaced relation to leading end thereof prior to movement of casing into passageway, leaving outwardly projecting end which engages leading portion of casing upon movement of product into engagement with casing and through passageway to draw casing into passageway.

BACKGROUND OF THE INVENTION

This invention relates to apparatus for incasing a product and more particularly to apparatus for applying a flexible, tubular casing to the outer surface of a product. My improved apparatus is particularly adapted for packaging meat products, such as hams and the like with a tubular knitted material.

Heretofore in the art to which my invention relates, difficulties have been encountered in packaging products with a flexible tubular casing due to the amount of time required to close and secure the leading end of the tubular casing prior to introduction of the product in addition to the time required to move the casing over the product whereby the casing engages the product with a snug fit. Also, considerable time is required to supply and cut the tubular casing in proper lengths for incasing products.

BRIEF SUMMARY OF INVENTION

In accordance with my present invention, a supply of flexible, tubular casing is supported for longitudinal movement in a first direction along the outer surface of a support member with the support member having a longitudinally extending passageway therethrough for passing the casing in a reverse direction as the product is incased. Twist is applied to the casing in spaced relation to the leading end thereof prior to movement of the casing in the reverse direction, thus providing an end portion which projects outwardly from the twist and moves inwardly of the leading end of the casing upon movement of the casing in the reverse direction. The product is forced through the passageway into engagement with the outwardly projecting end portion of the casing so as to force the end portion into engagement with the adjacent leading portion of the casing whereby the product moves inwardly of the casing as it draws the casing in said reverse direction.

Apparatus embodying features of my invention is illustrated in the accompanying drawings, forming a part of this application, in which:

FIG. 1 is a top plan view of the apparatus, partly broken away;

FIG. 2 is an enlarged, side elevational view, partly broken away;

FIG. 3 is an enlarged view taken generally along the line 3—3 of FIG. 2;

FIG. 4 is a sectional view taken generally along the line 4—4 of FIG. 3;

FIG. 5 is a sectional view taken generally along the line 5—5 of FIG. 1;

FIG. 6 is an enlarged, fragmental, sectional view showing the position of the product and the casing after twist is applied to the casing; and, FIG. 7 is a view corresponding generally to FIG. 6 showing the product inwardly of the casing and the casing drawn inwardly of the support means therefor.

Referring now to the drawings for a better understanding of my invention, I show a supporting frame 10 comprising a horizontally extending box-like frame member 11 which is secured to and supported by downwardly and outwardly extending legs 12.

Upstanding, spaced apart brackets 13 are carried by one end of the horizontal member 11, as shown in FIG. 5, for receiving therebetween the lower end of a depending bracket 14. Aligned openings are provided through the brackets 13 and 14 for receiving retaining bolts 16 having nuts 17 therefor Secured rigidly to the upper end of bracket 14 by suitable means, such as by welding at 18 is a support member 19 for supporting a flexible, tubular casing 21 which in turn is carried by a sleeve-like member 20 adapted to telescope over member 19. In the drawings, I show the support member 19 as being cylindrical in shape whereby it is adapted to support a flexible, tubular casing 21 with or without the sleeve-like member 20 for longitudinal movement toward the right, as viewed in FIGS. 1, 2, 6 and 7 of the drawings. By providing a cylindrical support member 19, a passageway 22 is provided therethrough for passing the casing 21 in a reverse direction to the direction of movement of the casing along the outer surface of support member 19. The end of the cylindrical support member 19 at which the tubular casing 21 moves inwardly thereof is rounded as at 23 to facilitate movement of the casing 21 around the end of and inwardly of the cylindrical support 19. By pivotally connecting the lower end of bracket 14 to the upstanding bracket 13 carried by the elongated frame member 11, the cylindrical support member 19 may be moved from the horizontal position shown to an upstanding position for receiving a supply of casing material, such as knitted, stockinett material employed to package meat products, such as hams and the like. Also, it will be apparent that other type, flexible, casing material 21 may be employed.

Secured to the horizontal frame member 11, as shown in FIG. 2, are spaced apart, upstanding support brackets 24. The upper ends of support brackets 24 are secured rigidly to the undersurface of an elongated feed chute indicated generally at 26. Preferably, the feed chute 26 is formed of a cylindrical material with an intermediate portion cut away as at 27 for introducing a product 28 to be incased, such as a ham or the like. Secured to the end of the cylindrical feed chute 26 adjacent the cylindrical support member 19 is a sleeve-like member 29 which projects toward the adjacent end of the cylindrical support member 19, as clearly shown in FIG. 6. Mounted for rotation about the outer surface of the sleeve-like member 29 is a bearing sleeve member 31 which is secured to the inner surface of an annular member 32 whereby the annular member 32 and the bearing sleeve 31 are adapted for axial and rotary motion relative to the sleeve-like member 29.

Mounted at opposite sides of the feed chute 26, as shown in FIGS. 1, 2 and 4 are outwardly extending brackets 33 and 34. Suitable openings 36 are provided in each of the brackets 33 and 34 for slidably receiving elongated rod-like members 37 which extend forwardly toward the end of the sleeve-like member 19 and then inwardly as at 38. Mounted for rotation adjacent the inner end of each inwardly extending portion 38 is a roller 39 which is adapted to engage a radially extending face 41 of an annular member 42 secured rigidly to the annular member 32, as shown in FIG. 4. An annular recess 43 is provided in the annular member 42 for receiving a drive belt 44 whereby rotary motion is imparted to the annular member 32. The drive belt 44 passes around a drive pulley 46 which is operatively connected to a motor unit indicated generally at 47. As shown in FIG. 4, each bracket 33 and 34 is provided with a cut-out portion 48 exposing an intermediate portion of the rod-like member 37. A compression spring 49 surrounds each of the rod-like members 37 within the cut-out portion 48 and a stop pin 50 is secured to each rod-like member 37 whereby the compression spring 49 imparts a force to the rod-like members 37 to urge the rollers 39 toward the faces 41 of the annular members 42, thus urging the annular member 32 toward the brackets 33 and 34 or toward the receiving end of the feed chute 26.

Arcuate cam members 51 and 52 are secured rigidly to the sleeve-like member 29 adjacent the forward end of feed chute 26 in position to engage movable cam members 53 and 54 carried by the movable, annular member 32. The cam surfaces of the cam members 51 and 52 are positioned 180° from each other whereby upon engagement with the cam members 53 and 54, the annular member 32 is moved forwardly toward the adjacent end of the cylindrical support member 19. By providing cam members 51 and 52 at opposite sides of the feed chute 26, an even pressure is exerted against the cam members 53 and 54 whereby the annular member 32 is moved axially toward the cylindrical support 19. As shown in FIGS. 4 and 6, movable cam member 53 is positioned whereby it moves under stationary cam 52 whereas movable cam 54 is positioned whereby it moves over stationary cam 51. Accordingly, the movable cam 53 engages stationary cam 51 while movable cam 54 engages stationary cam 52 at the same time to move the annular member 32 toward the adjacent end of cylindrical support member 19 each time the annular member 32 is rotated 360°. After cam members 53 and 54 move out of engagement with stationary cam members 51 and 52, respectively, the springs 49 urge the rollers 39 and the annular member 32 toward the receiving end of feed chute 26 whereby sleeve-like member 29 moves away from the adjacent end of cylindrical support member 19. Each arcuate cam member 53 and 54 covers an angular distance of approximately 90° whereby the sleeve-like member 29 is returned by springs 49 to the position shown in FIG. 2 immediately upon severing the casing which incases a preceding product in a manner to be described hereinafter.

Mounted for rotation in angularly spaced openings through the rotatable member 32 are a plurality of shaft-like members 56. Secured rigidly to each shaft-like member 56 is an outwardly projecting cam member 57 having its inner end adapted for movement in an annular recess 58 provided in annular member 32. Each cam member 57 is urged in a clockwise direction, as viewed in FIG. 3, by a tension spring 59. Angularly spaced cam engaging members 61 are carried by suitable support brackets indicated generally at 60 which are rigidly secured to a stationary part of the feed chute 26 whereby upon rotation of the cam members 57 in the direction of the arrow 65, the cam member 57 engages cam engaging members 61 to thus rotate each cam member 57 and its shaft 56 in a counterclockwise direction. Accordingly, upon disengagement with the cam engaging members 61, each cam 57 and its associated shaft 56 rotates in a clockwise direction, as viewed in FIG. 3, to its original position due to the force exerted by tension springs 59.

Mounted rigidly at the forward end of each shaft 56 adjacent the end of cylindrical support 19 is a casing pick-up member 62 having an inner end which is curved in the direction of rotation of the annular member 32. An annular recess 63 is provided adjacent the end of the cylindrical support member 19 in position to receive the curved inner ends of the casing pick-up members 62 while the cams 57 are engaged with the cam engaging members 61. The cam members 57 are so positioned relative to the cam engaging members 61 that each cam 57 is depressed by the cam engaging member 61 at the time the annular member 32 approaches its forwardmost position by engagement of rotary cams 53 and 54 with stationary cams 51 and 52. Accordingly, the casing pick-up members 62 are in position to enter annular recess 63 each time the annular member 32 approaches its forwardmost position. As the casing pick-up member moves inwardly of the annular recess 63, it engages the casing 21 and then moves outwardly of the annular recess 63 whereby the casing is then attached to the pick-up members 62 as the annular member 32 returns to the position shown in FIG. 6.

A plurality of angularly spaced recesses 64 are provided in the forward edge of the annular member 32 for receiving a movable member 66 which is urged outwardly of the recess 64 and toward the adjacent end of cylindrical support 19 by a compression spring 67. A forwardly opening recess 68 is provided adjacent the forward end of each movable member 66 for receiving a disc-like cutter 69 mounted on a shaft 71, as shown in FIG. 6. Elongated slots 72 are provided in the annular member 32 for receiving the ends of shaft 71 whereby the cutter 69 is adapted for inward movement toward its compression springs 67. The cutters 69 are adapted to engage the adjacent end of the cylindrical support member 19 immediately after the pick-up members 62 have engaged the casing 21 whereby the casing is severed immediately after the casing is picked up by the members 62. Accordingly, the cutters 69 sever the preceding casing section which incases a product 28, as shown in FIG. 7, from the next casing section which is to be applied to the next product 28 introduced through the feed chute 26. After the casing 21 is picked up by the pick-up members 62 and the preceding casing section has been severed therefrom, continued rotation of the annular member 32 imparts twist to the casing 21, as clearly shown in FIG. 6, to provide an outwardly projecting portion 73 which engages the adjacent leading portion of the casing section adjacent thereto. As the product 28 moves inwardly of the casing, as shown in FIG. 7, it draws the casing in the opposite direction from the direction of feed along the outer surface of the cylindrical support member 19. Accordingly, the outwardly extending portion 73 engages both the product 28 and the adjacent leading portion of the casing 21 thus closing and sealing the forward end of the product 28 as the product is forced through the support member 19. With the product 28 in the position shown in FIG. 7, the apparatus is ready for another cycle of operation whereby the next casing section is again picked up by the members 62 whereupon the preceding casing section is then separated from the next casing section as described above.

The product 28 is forced through the feed chute 26 and the support member 19 by an actuating indicated generally at 74 which is preferably provided with a concave forward end surface 76. The actuating member is provided with a piston rod 77 which extends inwardly of a pneumatic cylinder 78 having suitable supply conduits 79 for supplying air under pressure to selected sides of the piston within cylinder 78. Mounted on the feed chute 26 in position to be engaged by the actuating member 74 upon forward movement thereof is a switch unit 81 which is operatively connected to motor 47 whereby rotation of the annular member 32 is commenced. Mounted on the rotary member 32 is a detent 82 which is in position to engage a switch element 83 upon completion of one revolution of rotation of annular member 32. The switch element 83 interrupts the circuit to the motor 47 whereby rotation is stopped until the switch element 81 is again actuated by the actuating member 74.

As a safety feature, I provide hand operated valve members 84 and 86 in circuit with the line supplying air under pressure to the cylinder 78. The hand operated valves 84 and 86 are each adapted to interrupt supply of air to the cylinder 78 whereby both valves 84 and 86 must be depressed before air is introduced into cylinder 78 to force piston rod 77 forward.

While I have shown the rotary member as rotating in a counterclockwise direction, as viewed in FIG. 3, it will be apparent that the rotary member 32 could rotate in the opposite direction by rearranging the other components carried by annular member 32. That is, twist could be applied to the casing 21 in either directions of rotation.

From the foregoing description, the operation of my improved apparatus for incasing a product with a flexible tubular casing will be readily understood. Upon placing a product 28 in the feed chute 26, both hand valves 84 and 86 are depressed whereupon the actuating member 74 moves forward to engage switch element 81. The motor 47 is thus energized to commence rotation of the annular member 32 whereupon annular member 32 is moved toward member 19. Pick-up members 62 engage the casing and knives 69 then engage end of member 19 to sever casing 21. Twist is then applied to the casing 21 in spaced relation to the leading end thereof whereby an outwardly projecting end portion 73 is provided and is held in the position shown in FIG. 6 by the casing pick-up members 62. Continued forward movement of the actuating member 74 forces the product 28 into engagement with the outwardly projecting end portion 73 whereupon the end portion 73 is held secure between the product 28 and the adjacent leading portion of the casing section for the product 28. The forward end of the casing 21 is thus closed and secured firmly to the forward end of the product 28, as shown in FIG. 7, while the trailing end of the casing section 21 surrounding product 28 extends around the adjacent end of the cylindrical support member 19 in position for another cycle of operation. That is, with the casing 21 in the position shown in FIG. 7, upon introduction of another product 28 and forward movement of actuating member 74, the switch element 81 is again actuated to energize motor 47 whereupon rotary motion is again imparted to annular member 32. As the annular member 32 approaches its forwardmost position, the cams 57 engage cam engaging members 61 to rotate pick-up members 62 whereby they move inwardly of the annular recess 63 and engage the casing just prior to movement of the knife elements 69 into engagement with the end of cylindrical support member 19. Upon engagement of the knife member 69 with the end of support member 19, the preceding casing section is separated from the next casing section and continued rotation of the annular member 32 imparts twist to the next casing section, as shown in FIG. 6.

From the foregoing, it will be seen that I have devised improved apparatus for incasing a product with a flexible tubular casing. By closing the leading end of the casing with the outwardly projecting portion 73, no additional tying means is required and at the same time no labor is required to tie or secure the leading end of the casing prior to application to the product. Also, by providing the outwardly projecting portion 73 between the product 28 and the leading end of the casing, my apparatus is particularly adapted for packaging meat products due to the fact that the juices are retained with the product adjacent the lower end thereof during subsequent curing operations. That is, after application of the casing, such as a stockinette material to the outer surface of a meat product, the product is supported by the trailing end of the casing for smoking or other treatment prior to the sale of the product. Furthermore, by providing a self-contained unit which completely incases the product within the casing without additional labor after introduction of the product into the feed chute, I greatly reduce the cost of packaging products, such as meat products and the like.

While I have shown my apparatus as being particularly adapted for use with flexible tubular casing material, such as stockinette material for meat products, it will be apparent that many other types of tubular casing material may be employed for incasing products of various sizes and shapes.

While I have shown my invention in but one form, it will be obvious to those skilled in the art that it is not so limited, but is susceptible of various other changes and modifications without departing from the spirit thereof.

What I claim is:

1. Apparatus for incasing a product with a flexible, tubular casing comprising:
    (a) a support member disposed to support a flexible tubular casing for longitudinal movement in a first direction along its outer surface and having a longitudinally extending passageway therethrough for passing said casing in a reverse direction to said first direction after movement in said first direction,
    (b) means applying twist to said casing in spaced relation to the leading end thereof prior to movement of said casing in said reverse direction providing an end portion which projects outwardly from said twist and moves inwardly of the leading end of said casing upon movement of said casing in said reverse direction, and
    (c) means passing a product to be incased through said passageway in said reverse direction while said twist is applied engaging said product with said end portion projecting outwardly from said twist and forcing said end portion into engagement with the adjacent leading portion of said casing so that said product moves inwardly of said casing and draws said casing in said opposite direction.

2. Apparatus for incasing a product as defined in claim 1 in which said support member is a tube-like housing.

3. Apparatus for incasing a product as defined in claim 1 in which the means applying twist comprises:
    (a) angularly spaced casing pick-up members mounted for movement into and out of engagement with the leading end of said casing, and
    (b) means imparting relative rotary motion between said casing pick-up members and said support member while said pick-up members are in engagement with said leading end whereby twist is applied to said casing between said casing pick-up members and said support member.

4. Apparatus for incasing a product as defined in claim 1 in which a quantity of tubular casing is carried by said support member to incase a plurality of products sequentially and means is provided to sever the trailing end of the casing incasing a preceding product just prior to applying twist adjacent the leading end of the casing for the next product whereby the casing for said preceding product is separated from the casing for said next product.

5. Apparatus for incasing a product as defined in claim 4 in which the means to sever the casing comprises:
    (a) angularly spaced cutters mounted for engagement with the end of said support member adjacent the point the direction of movement of said casing changes from said first direction to said reverse direction.

6. Apparatus for incasing a product as defined in claim 5 in which said cutters are carried by a rotary member adapted for axial movement toward and away from said end of the support member, and cooperating cam members move said rotary member toward and away from said end of the support member.

7. Apparatus for increasing a product as defined in claim 1 in which said means passing a product to be incased through said passageway comprises:
    (a) an elongated feed chute mounted in longitudinal alignment with said support member in position to receive a product to be incased and deliver said product to said passageway in said support member, and (b) a plunger-like member mounted for longitudinal movement in said feed chute and said passageway for delivering said product to said passageway and then forcing said product through said passageway.

8. Apparatus for incasing a product as defined in claim 7 in which the side of said plunger-like member which engages the product to be incased is concave and is operatively connected to a power actuated unit for reciprocating said plunger-like member.

References Cited

UNITED STATES PATENTS

| | | | |
|---|---|---|---|
| 2,924,924 | 2/1960 | Garapolo et al. | 53—370X |
| 2,934,873 | 5/1960 | Thatcher | 53—181X |
| 3,389,533 | 6/1968 | Tipper et al. | 53—14X |

TRAVIS S. McGEHEE, Primary Examiner

E. F. DESMOND, Assistant Examiner

U.S. Cl. X.R.

53—253